(12) United States Patent
Frank

(10) Patent No.: US 8,807,480 B2
(45) Date of Patent: Aug. 19, 2014

(54) METHOD OF EXTENDING AIRCRAFT UNDERCARRIAGES IN EMERGENCY MODE

(71) Applicant: Messier-Bugatti-Dowty, Velizy-Villacoublay (FR)

(72) Inventor: David Frank, Velizy-Villacoublay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 98 days.

(21) Appl. No.: 13/653,745

(22) Filed: Oct. 17, 2012

(65) Prior Publication Data

US 2013/0228649 A1    Sep. 5, 2013

(30) Foreign Application Priority Data

Nov. 9, 2011    (FR) ...................... 11 60214

(51) Int. Cl.
*B64C 25/50*    (2006.01)
(52) U.S. Cl.
USPC .................... 244/104 FP; 244/102 R; 303/10
(58) Field of Classification Search
USPC ......... 244/104 FP, 102 R, 111, 110 R, 110 H, 244/110 A, 100 R, 50
See application file for complete search history.

(56) References Cited

U.S. PATENT DOCUMENTS

| | | | |
|---|---|---|---|
| 2,457,467 A * | 12/1948 | Hartman ......................... | 60/475 |
| 4,573,649 A * | 3/1986 | Yourkowski et al. ..... | 244/102 R |
| 5,181,380 A * | 1/1993 | Favre et al. ..................... | 60/405 |
| 8,028,954 B2 * | 10/2011 | Leutard et al. ............ | 244/102 R |
| 8,136,760 B2 * | 3/2012 | Leutard et al. ............ | 244/102 R |
| 8,393,565 B2 * | 3/2013 | Frank et al. ..................... | 244/50 |
| 2003/0164422 A1 * | 9/2003 | Collet et al. .............. | 244/102 R |
| 2004/0195909 A1 * | 10/2004 | Hamzeh et al. ................. | 303/10 |
| 2008/0087765 A1 * | 4/2008 | Leutard et al. ............ | 244/102 R |
| 2008/0087766 A1 * | 4/2008 | Leutard et al. ............ | 244/102 R |
| 2009/0152394 A1 * | 6/2009 | Frank et al. ..................... | 244/58 |
| 2011/0100769 A1 * | 5/2011 | Frank ........................ | 188/106 R |
| 2011/0100770 A1 * | 5/2011 | Frank ........................ | 188/106 R |

FOREIGN PATENT DOCUMENTS

| | | |
|---|---|---|
| DE | 102006048399 A1 | 4/2008 |
| EP | 1914163 A1 | 4/2008 |
| EP | 2070818 A1 | 6/2009 |
| FR | 2827346 A1 | 1/2003 |

* cited by examiner

*Primary Examiner* — Christopher P Ellis
*Assistant Examiner* — Medhat Badawi
(74) *Attorney, Agent, or Firm* — Sughrue Mion, PLLC

(57) ABSTRACT

A method of actuating undercarriage latching boxes and associated hatch latching boxes of an aircraft in an emergency mode, the latching boxes having at least one feed port and at least one unlatching member that is operable when the port is fed with fluid under pressure, the aircraft also being provided with a hydraulic braking circuit. The method includes connecting at least one tapping circuit to the braking circuit of the aircraft in association with an isolation valve that is kept, in a normal mode, in an isolation state and that can be controlled to be placed in an open state in which at least some of the feed ports of the latching boxes are fed by the tapping circuit connected to the braking circuit.

6 Claims, 4 Drawing Sheets

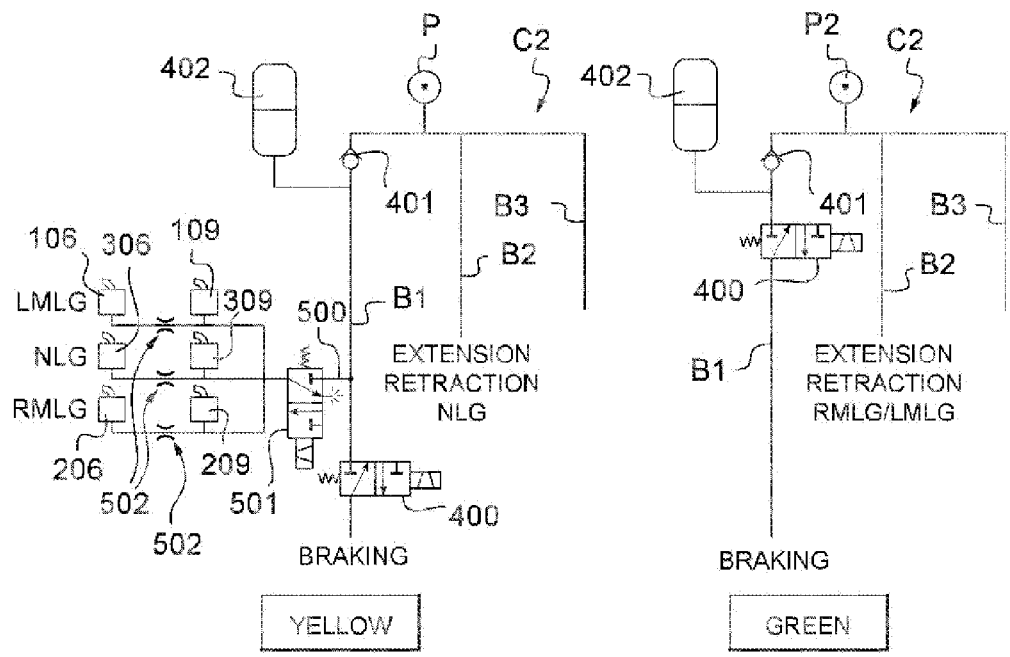
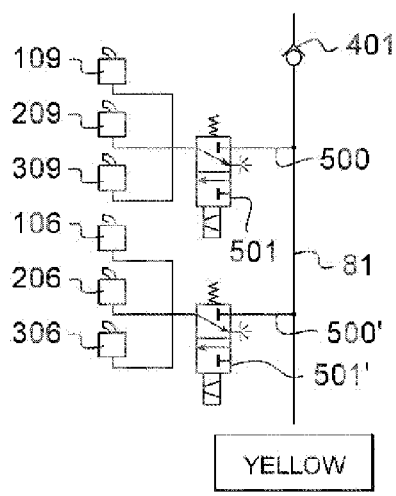

METHOD OF EXTENDING AIRCRAFT UNDERCARRIAGES IN EMERGENCY MODE

The invention relates to a method of extending aircraft undercarriages in emergency mode.

TECHNOLOGICAL BACKGROUND OF THE INVENTION

On aircraft, undercarriages are generally extended in normal mode by means of a hydraulic circuit having hydraulic components adapted to work in sequence for unlocking and opening the undercarriage hatches, and then unlocking and extending the undercarriages, and possibly also for reclosing and relocking at least some of the hatches.

In the event of an undercarriage failing to extend, as a result of the failure of the hydraulic circuit or of an associated member, emergency means are provided for enabling the undercarriages to be extended.

This emergency mode is very often a mechanical mode. It consists in actuating the hatch latching boxes and the undercarriage latching boxes by means of rodding or cables actuated by the pilot using a release lever for releasing the hatches and the undercarriages so that they can then extend under the effect of gravity. Recently, proposals have been made to perform emergency actuation of latching boxes by using electric actuators. Proposals have also been made for a combined electrical and hydraulic mode that uses a pump driven by an electric motor to act for the purpose of unlatching the latching boxes by means of pressure.

Under all circumstances, emergency actuation constitutes a system in its own right that, in normal mode, is segregated and consequently requires a large amount of additional equipment. This results in an increase in weight and a reduction in the reliability of the system for extending undercarriages, and also to an associated high cost.

OBJECT OF THE INVENTION

An object of the invention is to propose deploying undercarriages in a manner that is simple and inexpensive and that can be used in particular for emergency extension.

BRIEF SUMMARY OF THE INVENTION

In order to achieve this object, the invention provides a method of actuating undercarriage latching boxes and associated hatch latching boxes of an aircraft in an emergency mode, the latching boxes having at least one feed port and at least one unlatching member that is operable when the port is fed with fluid under pressure, the aircraft also being provided with a hydraulic braking circuit. According to the invention, the method consists in connecting at least one tapping circuit to the braking circuit of the aircraft in association with an isolation valve that is kept, in a normal mode, in an isolation state and that can be controlled to be placed in an open state in which at least some of the feed ports of the latching boxes are fed by the tapping circuit connected to the braking circuit.

It is known that the braking circuit is generally provided with an accumulator that provides a reserve of hydraulic energy and that enables pressure to be maintained in the braking circuit in the event of a failure of the pressure feed. It should be observed that this energy reserve is monitored ever more closely (by means of pressure sensors) in order to satisfy recent requirements of aviation authorities.

The tapping circuit and the valve proposed in accordance with the invention make it possible, while the valve is closed, to interrupt feed to the latching boxes from this tapping circuit so as to prevent untimely unlatching of the boxes, and while the valve is open, they enable the actuators of the latching boxes to be subjected to the pressure that is maintained by the accumulator of the braking circuit.

On being actuated, the volume of fluid consumed by the unlocking member in each latching box is minimal, and at worst will require only small redimensioning of the volume of the accumulator for the braking circuit. This ensures emergency extension of the undercarriages by means of a device that is particularly simple and lightweight, since it amounts to no more than adding a valve and some pipework.

Preferably, when the aircraft is fitted with first and second hydraulic braking circuits, each providing a fraction of the braking of the aircraft, provision is made on each of the hydraulic braking circuits for a tapping circuit and an isolation valve, so as to connect the first and second hydraulic braking circuits respectively firstly to the feed ports of the latching boxes for the undercarriages and the associated hatches in a first group of undercarriages, and secondly to the feed ports of the latching boxes of the undercarriages and associated hatches of a second group of undercarriages complementary to the first group.

In a variant, and still when the aircraft has first and second hydraulic braking circuits, each providing a respective fraction of the braking of the aircraft, a tapping circuit and an isolation valve is provided on only one of the hydraulic braking circuits for connecting that hydraulic braking circuit firstly to the emergency feed ports of the hatch latching boxes and secondly to the feed ports of the undercarriage latching boxes.

DESCRIPTION OF THE FIGURES

The invention can be better understood in the light of the following description of variant implementations of the invention given with reference to the figures of the accompanying drawings, in which:

FIG. 4 is a diagram of a hydraulic circuit of an aircraft having two braking circuits, with a tapping circuit of the invention for feeding the emergency feed ports of the latching boxes;

FIG. 4bis is a diagram of a variant implementation of the FIG. 1 hydraulic circuit;

DETAILED DESCRIPTION OF IMPLEMENTATIONS OF THE INVENTION

Figure 1:
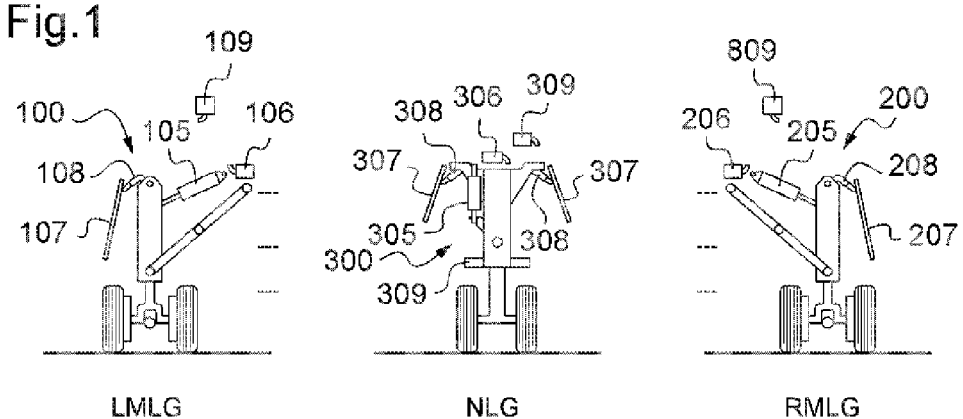
FIG. 1 is a diagrammatic view of undercarriages and the associated hatches in a typical aircraft.

As shown in FIG. 1, the invention is described herein with reference to an aircraft having two main undercarriages 100 and 200 (referred to respectively as left main landing gear (LMLG) and right main landing gear (RMLG)). The main undercarriages are operated by actuators 105, 205 so as to be extended or retracted out from or into bays that are closed by hatches 107, 207, themselves actuated by actuators 108, 208. The LMLG and RMLG undercarriages 100, 200 are held in the retracted position by latching boxes 106, 206, while the hatches are held closed by latching boxes 109, 209.

The aircraft also has a nose undercarriage 300 (also referred to as nose landing gear (NLG)) operated by an actuator 305 to be extended or retracted out from and into a well that is closed by hatches 307, themselves actuated by actuators 308. The NLG undercarriage 300 is held in the retracted position by a latching box 306, and the hatches are held closed by a latching box 309.

This landing gear configuration is give purely by way of illustration and does not in any way limit possibilities of applying the invention to other configurations.

Figure 2:
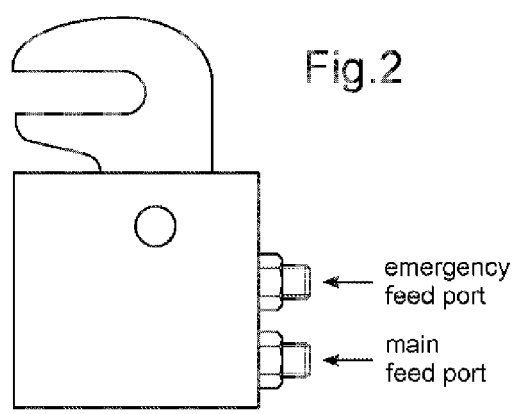
FIG. 2 is a diagram of a latching box with a main hydraulic feed port and an emergency hydraulic feed port.

As shown diagrammatically in FIG. 2, each of the undercarriage latching boxes 106, 206, and 306, and each of the hatch latching boxes 109, 209, and 309 in this example has two hydraulic ports. One of the ports is for feeding a main unlatching actuator and it is fed by the extension/retraction circuit of the aircraft. The other port is for feeding an emergency unlatching actuator. This emergency actuator is used in the event of the main actuator being unavailable (jammed, no feed, . . . ). Each of the actuators causes the hook to become unlatched so that it releases the element it was holding, either a hatch or an undercarriage.

According to the invention, the emergency actuators are powered by a tapping circuit from the braking circuit of the invention, which tapping circuit is closed by an isolating valve.

Figure 3:
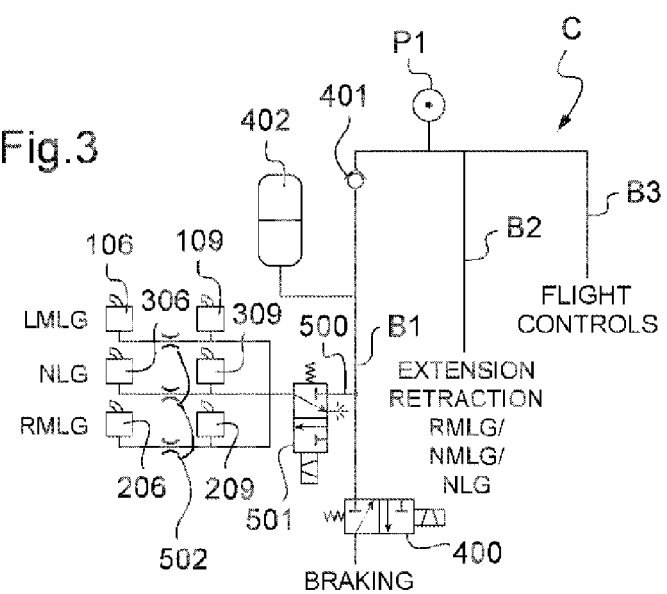
FIG. 3 is a diagram of a hydraulic circuit of an aircraft having a single braking circuit with a tapping circuit of the invention for feeding the emergency feed ports of the latching boxes.

In a first implementation shown in FIG. 3, the aircraft has a single hydraulic circuit C with a pressure source P (e.g. a pump driven by one of the engines of the aircraft). In this example, the circuit has three branches, respectively a branch B1 for performing braking functions, a branch B2 for extending/retracting the undercarriages, and a branch B3 for feeding flight controls.

In this example, the branch B2 serves to extend and retract the undercarriages. It has connected thereto the actuators 105, 205, and 305 for actuating the undercarriages and also the actuators 108, 208, and 308 for actuating the hatches. It also has connected thereto the main actuators of the latching boxes 106, 206, & 306, and 109, 209, & 309. Controlled valves serve to feed all of those elements in sequence so as to guarantee that the undercarriages are extended only once the hatches are unlatched and open. This is well known.

The braking branch B1 is closed by an isolation valve 400 that isolates the braking circuit and the brakes from the remainder of the hydraulic circuit of the aircraft. Thereafter, the branch B1 has a check valve 401. An accumulator 402 is provided downstream from the check valve so as to maintain some minimum level of pressure in the branch B1. The check valve 401 enables the accumulator to be kept under pressure, in the event of the pump P failing or in the event of a break in upstream pipework. As is well known, the accumulator 402 forms a reserve of energy and acts as a source of pressure and of flow to enable the brake to be actuated a certain number of times by the pilot in the event of the pump P failing. In normal operation, the accumulator 402 is kept under pressure by the pump P.

According to the invention, a tapping circuit 500 extends from the branch B1 downstream from the check valve 401 for the purpose of feeding all of the emergency actuators of the undercarriage latching boxes 106, 206, and 306, and all of the hatch latching boxes 109, 209, and 309. The tapping circuit 500 is kept closed under normal circumstances by an isolation valve 501 that connects the emergency actuators of the latching boxes to a return circuit.

In the event of it being impossible to unlatch the hatches or the undercarriages with the help of the main actuators of the latching boxes, it then suffices to open the isolation valve 501 in order to admit the pressure that is maintained by the accumulator 402 into the emergency actuators of the latching boxes. This serves to unlatch the latching boxes, thereby enabling emergency extension of the undercarriages under the effect of gravity.

It should be observed that, as before, emergency mode unlatching of the undercarriages takes place after the hatches have been unlatched, with this being ensured by constrictions arranged in the feed lines of the boxes between each undercarriage latching box and the associated hatch latching box, so as to ensure that actuation sequencing is provided between unlatching of the hatches and unlatching of the undercarriages.

In a second implementation shown in FIG. 4, the aircraft has two hydraulic circuits C1 and C2 (known as YELLOW and GREEN), each having its own pump P1 or P2 driven by a distinct engine of the aircraft. The branch B2 of the circuit C1 is used for extending/retracting the nose landing gear 300 in a main mode, while the branch B2 of the circuit C2 is used for extending/retracting the main undercarriages 100, 200 in the main mode.

According to the invention, a tapping circuit 500 is connected to the braking branch B1 of the circuit C1 downstream from the check valve 401 for feeding all of the emergency actuators of the undercarriage latching boxes 106, 206, and 306, and all of the hatch latching boxes 109, 209, and 309.

Thus, only one of the braking circuits (and thus only one of the accumulators) is used for supplying pressure to all of the emergency actuators of the latching boxes. In the variant shown in FIG. 4b is, sequencing may be provided differently by providing two isolation valves 501 and 501' fitted to two tapping circuits 500 and 500' that are associated respectively with the hatch boxes 109, 209, and 309, and with the undercarriage boxes 106, 206, and 306. It then suffices to operate the two isolation valves 501 and 501' in sequence to ensure the actuation sequencing between the unlatching of the hatches and the unlatching of the undercarriages.

Figure 5:
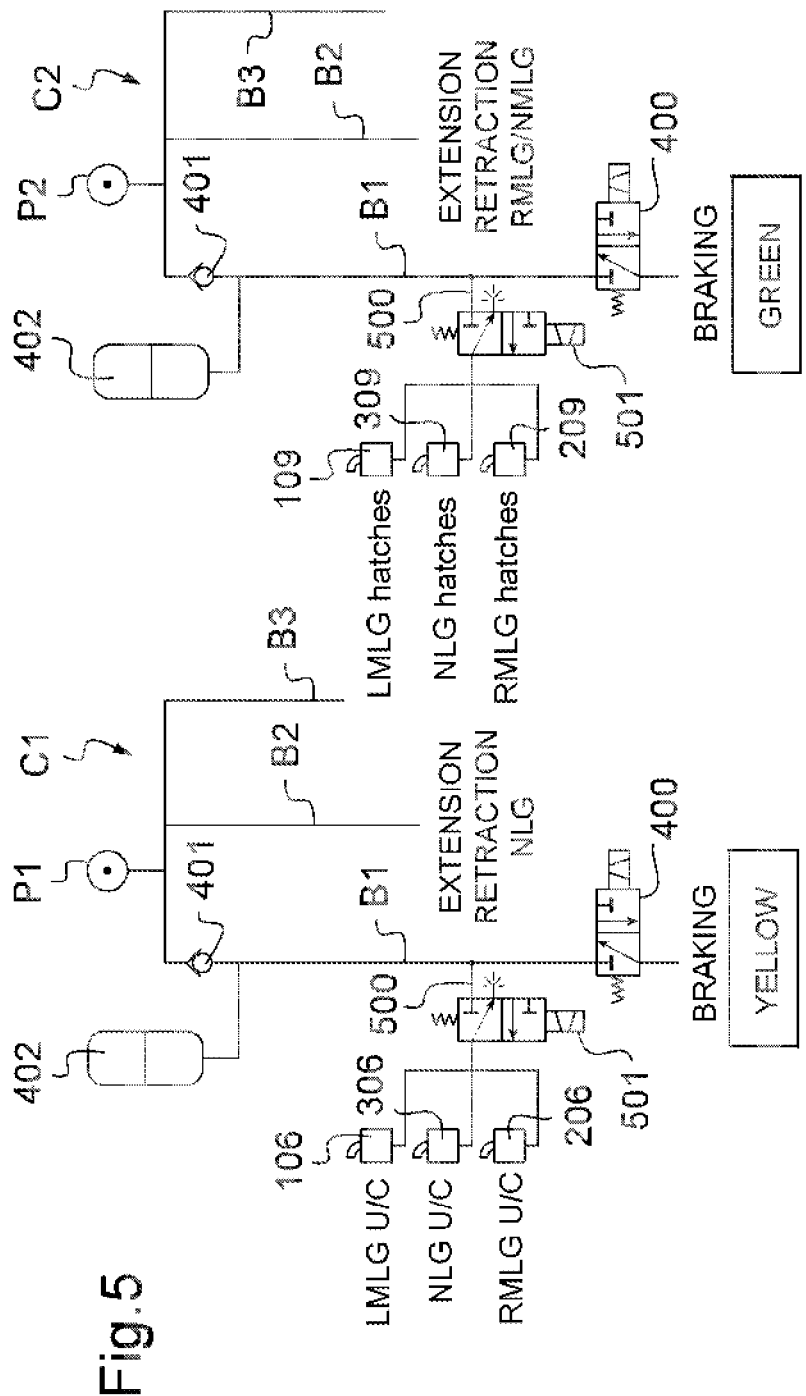
FIG. 5 is a diagram of a hydraulic circuit of an aircraft having two braking circuits with two tapping circuits of the invention.

In a third implementation shown in FIG. 5, the aircraft has two hydraulic circuits C1 and C2 (known as YELLOW and GREEN) each having its respective pumps P1 and P2 driven by a distinct engine of the aircraft. The branch B2 of the circuit C1 is used for extension/retraction of the nose undercarriage 300 in main mode, while the branch B2 of the circuit C2 is used for extension/retraction of the main undercarriages 100, 200 in main mode.

According to the invention, a tapping circuit 500 is connected to the branch B1 of the circuit C1 for feeding all of the emergency actuators of the undercarriage latching boxes 106, 206, and 306, and a branch 500 is connected to the branch B1 of the circuit C2 for feeding all of the emergency actuators of the hatch latching boxes 109, 209, and 309.

Figure 6:
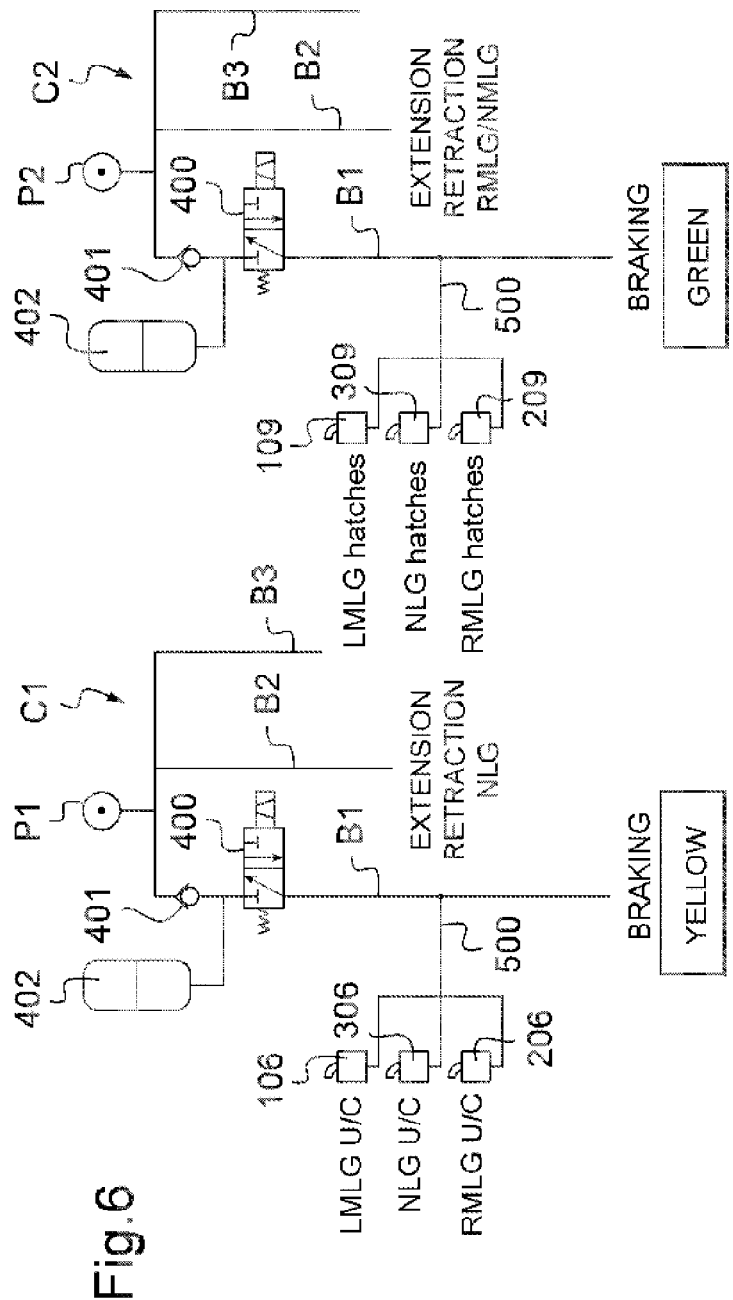
FIG. 6 is a figure analogous to FIG. 5 showing a variant implementation of the invention.

According to a particular aspect, the invention may be implemented without necessarily adding a specific isolation valve 501 to the tapping circuit 500, as shown in the variant of FIG. 6. This variant is very similar to that shown in FIG. 5 except that the isolation valve 501 on the left circuit (or YELLOW circuit) has been eliminated, with the isolation function in this example being provided directly by the braking isolation valve 400 that normally serves to isolate the emergency braking branch B1 of the YELLOW circuit.

For this purpose, it is appropriate for the tapping circuit 500 to be connected to the branch B1 downstream from the braking isolation valve 400. In all of the other examples shown herein, the tapping circuit 500 is on the contrary connected upstream of the braking isolation valve 400, which requires a specific isolation valve 501 to be installed in the tapping circuit 500.

This connection downstream Of the braking valve may naturally apply in all of the other examples shown herein.

The invention is not limited to the above description, but on the contrary covers any variant coming within the ambit defined by the claims.

In particular, although the boxes in the examples shown have main feed ports and emergency feed ports that are distinct for the purpose respectively of feeding a main unlatching actuator and an emergency unlatching actuator, such that the main and emergency actuation systems are completely segregated, the invention is not limited to that configuration. The invention could naturally be applied to any aircraft in which the latching boxes have only one unlatching actuator that may be actuated either by the main feed port or by the emergency feed port.

The invention also provides an aircraft in which a latching box is fitted with a single actuator and a single feed port that constitutes both the main feed port and the emergency feed port.

What is claimed is:

1. A method of actuating undercarriage latching boxes and associated hatch latching boxes of an aircraft in an emergency mode, the latching boxes having at least one feed port and at least one unlatching member that is operable when the port is fed with fluid under pressure, the aircraft also being provided with a hydraulic braking circuit, the method comprising:

connecting at least one tapping circuit to the braking circuit of the aircraft in association with an isolation valve that is kept, in a normal mode, in an isolation state, and controlling said isolation valve to be placed in an open state in which at least some of the feed ports of the latching boxes are fed by the tapping circuit connected to the braking circuit.

2. The method according to claim 1, wherein the isolation valve is located directly in the tapping circuit.

3. The method according to claim 1, wherein the aircraft has a single braking circuit, and wherein the single tapping circuit that is connected thereto feeds the ports of all of the latching boxes.

4. The method according to claim 1, in which the aircraft has two hydraulic circuits defining two braking circuits, wherein a single tapping circuit is connected to one of the braking circuits in order to feed the ports of all of the latching boxes.

5. The method according to claim 1, in which the aircraft has two hydraulic circuits defining two braking circuits, wherein two respective tapping circuits are connected to each of the braking circuits, one of them feeding the ports of the hatch latching boxes and the other of them feeding the ports of the undercarriage latching boxes.

6. The method according to claim 1, in which the aircraft has two hydraulic circuits defining two braking circuits, wherein two respective tapping circuits are connected to each of the braking circuits, one of them feeding the ports of the main undercarriage latching boxes and of the associated hatch latching boxes, and the other feeding the ports of the nose undercarriage latching boxes and of the associated hatch latching boxes.

* * * * *